US012792240B2

(12) United States Patent
Roberts et al.

(10) Patent No.: US 12,792,240 B2
(45) **Date of Patent: *Nov. 10, 2026**

(54) ADAPTIVE CONTROL FOR IN-MEMORY VERSIONING

(71) Applicant: Micron Technology, Inc., Boise, ID (US)

(72) Inventors: David Andrew Roberts, Wellesley, MA (US); Haojie Ye, Ann Arbor, MI (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 19/022,888

(22) Filed: Jan. 15, 2025

(65) Prior Publication Data

US 2025/0156092 A1 May 15, 2025

Related U.S. Application Data

(63) Continuation of application No. 17/970,132, filed on Oct. 20, 2022, now Pat. No. 12,242,743.

(51) Int. Cl.
*G06F 3/06* (2006.01)

(52) U.S. Cl.
CPC .......... *G06F 3/0632* (2013.01); *G06F 3/0604* (2013.01); *G06F 3/0622* (2013.01); *G06F 3/0673* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 8,122,229 B2 2/2012 Wallach et al.
8,156,307 B2 4/2012 Wallach et al.
(Continued)

FOREIGN PATENT DOCUMENTS

CN 117882042 A 4/2024
CN 118426678 8/2024
(Continued)

OTHER PUBLICATIONS

US 11,995,332 B2, 05/2024, Brewer (withdrawn)
(Continued)

*Primary Examiner* — Daniel C. Chappell
(74) *Attorney, Agent, or Firm* — Schwegman Lundberg & Woessner, P.A.

(57) ABSTRACT

Disclosed in some examples are systems, devices, machine-readable mediums, and methods for customizing an in-memory versioning mode for each memory location according to a predicted access behavior to optimize memory device performance. Usage data in a previous time period may be utilized along with policy rules to determine whether to configure a particular memory address as a zero copy or direct copy mode. For example, memory addresses that are read frequently may be configured as direct copy mode to reduce the read latency penalty. This improves the functioning of the memory system by reducing read latency for memory addresses that are frequently read but written to less frequently, and reduces write latency for memory locations that are frequently written to, but not read as frequently.

20 Claims, 8 Drawing Sheets

(58) Field of Classification Search

CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H03M 7/00–707; H03M 13/00–6597; H03M 99/00; H04L 9/00–38; H04L 12/00–66; H04L 41/00–5096; H04L 49/00–9094; H04L 61/00–59; H04L 67/00–75; H10W 90/00–811; H10W 95/00; H10W 99/00

See application file for complete search history.

(56) References Cited

U.S. PATENT DOCUMENTS

| | | | |
|---|---|---|---|
| 8,205,066 | B2 | 6/2012 | Brewer et al. |
| 8,316,352 | B2 | 11/2012 | Lev et al. |
| 8,423,745 | B1 | 4/2013 | Brewer |
| 8,484,166 | B2 | 7/2013 | Gower |
| 8,516,021 | B2 | 8/2013 | Aronovich et al. |
| 8,561,037 | B2 | 10/2013 | Brewer et al. |
| 8,719,514 | B2 | 5/2014 | Adl-tabatabai et al. |
| 9,535,854 | B2 | 1/2017 | Lashley et al. |
| 9,678,839 | B2 | 6/2017 | Ventura et al. |
| 9,710,384 | B2 | 7/2017 | Wallach et al. |
| 9,875,042 | B1 | 1/2018 | Natanzon et al. |
| 9,959,061 | B1 | 5/2018 | Natanzon et al. |
| 10,042,579 | B1 | 8/2018 | Natanzon |
| 10,127,236 | B1 | 11/2018 | Zhou et al. |
| 10,409,493 | B1 | 9/2019 | Kucherov et al. |
| 10,509,764 | B1 | 12/2019 | Izenberg et al. |
| 10,664,358 | B1 | 5/2020 | Chen et al. |
| 10,747,676 | B2 | 8/2020 | Okrafka et al. |
| 10,990,391 | B2 | 4/2021 | Brewer |
| 10,990,392 | B2 | 4/2021 | Brewer |
| 11,321,006 | B1 | 5/2022 | Grunwald et al. |
| 11,693,593 | B2 | 7/2023 | Roberts et al. |
| 11,886,728 | B2 | 1/2024 | Brewer et al. |
| 12,118,224 | B2 | 10/2024 | Brewer |
| 12,242,743 | B2 * | 3/2025 | Roberts ................. G06F 3/0673 |
| 2007/0028056 | A1 | 2/2007 | Harris |
| 2008/0270708 | A1 | 10/2008 | Warner et al. |
| 2009/0019247 | A1 | 1/2009 | Praun et al. |
| 2011/0202725 | A1 | 8/2011 | Rose et al. |
| 2011/0302136 | A1 | 12/2011 | Lakshminath et al. |
| 2011/0314071 | A1 | 12/2011 | Johnson et al. |
| 2012/0079177 | A1 | 3/2012 | Brewer et al. |
| 2012/0158680 | A1 | 6/2012 | Shaughnessy |
| 2013/0138892 | A1 | 5/2013 | Loh et al. |
| 2013/0254477 | A1 | 9/2013 | Swanson et al. |
| 2013/0332711 | A1 | 12/2013 | Leidel et al. |
| 2014/0082322 | A1 | 3/2014 | Loh et al. |
| 2014/0258660 | A1 | 9/2014 | Cheriton |
| 2014/0351535 | A1 | 11/2014 | Santry |
| 2015/0143350 | A1 | 5/2015 | Brewer |
| 2015/0206561 | A1 | 7/2015 | Brewer et al. |
| 2015/0261461 | A1 | 9/2015 | Li et al. |
| 2016/0077922 | A1 | 3/2016 | Yoon et al. |
| 2016/0085585 | A1 | 3/2016 | Chen et al. |
| 2016/0147786 | A1 | 5/2016 | Andrei et al. |
| 2016/0328153 | A1 | 11/2016 | Krause |
| 2016/0342351 | A1 | 11/2016 | Li et al. |
| 2017/0185294 | A1 | 6/2017 | Moon et al. |
| 2018/0074748 | A1 | 3/2018 | Makin et al. |
| 2018/0173673 | A1 | 6/2018 | Daglis et al. |
| 2018/0253467 | A1 | 9/2018 | Gurajada et al. |
| 2018/0253468 | A1 | 9/2018 | Gurajada et al. |
| 2018/0260324 | A1 | 9/2018 | Marathe et al. |
| 2019/0042214 | A1 | 2/2019 | Brewer |
| 2019/0163394 | A1 | 5/2019 | Loh et al. |
| 2019/0171604 | A1 | 6/2019 | Brewer |
| 2019/0205244 | A1 | 7/2019 | Smith |
| 2019/0243700 | A1 | 8/2019 | Brewer |
| 2019/0303154 | A1 | 10/2019 | Brewer |
| 2019/0324928 | A1 | 10/2019 | Brewer |
| 2019/0340019 | A1 | 11/2019 | Brewer |
| 2019/0340020 | A1 | 11/2019 | Brewer |
| 2019/0340023 | A1 | 11/2019 | Brewer |
| 2019/0340024 | A1 | 11/2019 | Brewer |
| 2019/0340027 | A1 | 11/2019 | Brewer |
| 2019/0340035 | A1 | 11/2019 | Brewer |
| 2019/0340154 | A1 | 11/2019 | Brewer |
| 2019/0340155 | A1 | 11/2019 | Brewer |
| 2020/0026698 | A1 | 1/2020 | Benke et al. |
| 2020/0226035 | A1 | 7/2020 | Li |
| 2020/0257672 | A1 | 8/2020 | Lee et al. |
| 2020/0319980 | A1 | 10/2020 | Marathe et al. |
| 2020/0372163 | A1 | 11/2020 | Chung |
| 2021/0055964 | A1 | 2/2021 | Brewer |
| 2021/0064374 | A1 | 3/2021 | Brewer |
| 2021/0064435 | A1 | 3/2021 | Brewer |
| 2021/0149600 | A1 | 5/2021 | Brewer |
| 2021/0365092 | A1 | 11/2021 | Ruppel et al. |
| 2022/0019366 | A1 | 1/2022 | Freilich et al. |
| 2022/0066992 | A1 * | 3/2022 | Duval ................. G06F 12/0246 |
| 2022/0103622 | A1 | 3/2022 | Camargos et al. |
| 2022/0129196 | A1 | 4/2022 | Roberts et al. |
| 2022/0414015 | A1 | 12/2022 | Reisteter et al. |
| 2023/0060587 | A1 | 3/2023 | Brewer et al. |
| 2023/0106982 | A1 | 4/2023 | David et al. |
| 2023/0118155 | A1 | 4/2023 | Shveidel et al. |
| 2023/0137525 | A1 | 5/2023 | Karr |
| 2023/0325100 | A1 | 10/2023 | Brewer |
| 2024/0134545 | A1 | 4/2024 | Roberts et al. |

FOREIGN PATENT DOCUMENTS

| | | | |
|---|---|---|---|
| CN | 119156595 | | 12/2024 |
| KR | 101644125 | B1 | 7/2016 |
| KR | 20180030319 | A | 3/2018 |
| KR | 20190113359 | A | 10/2019 |
| WO | WO-2010051167 | A1 | 5/2010 |
| WO | WO-2013184380 | A2 | 12/2013 |
| WO | WO-2019191740 | A1 | 10/2019 |
| WO | WO-2019191742 | A1 | 10/2019 |
| WO | WO-2019191744 | A1 | 10/2019 |
| WO | WO-2019217287 | A1 | 11/2019 |
| WO | WO-2019217295 | A1 | 11/2019 |
| WO | WO-2019217324 | A1 | 11/2019 |
| WO | WO-2019217326 | A1 | 11/2019 |
| WO | WO-2019217329 | A1 | 11/2019 |
| WO | WO-2019089816 | A3 | 4/2020 |
| WO | WO-2022093961 | A1 | 5/2022 |
| WO | WO-2023018470 | A1 | 2/2023 |
| WO | WO-2023196053 | A1 | 10/2023 |

OTHER PUBLICATIONS

S. Chen, L. Peng and S. Irving, "Accelerating GPU hardware transactional memory with snapshot isolation," 2017 ACM/IEEE 44th Annual International Symposium on Computer Architecture (ISCA), Toronto, ON, Canada, 2017, pp. 282-294, doi: 10.1145/3079856.3080204. (Year: 2017).*

(56) References Cited

OTHER PUBLICATIONS

E. Lee, J. E. Jang, T. Kim and H. Bahn, "On-Demand Snapshot: An Efficient Versioning File System for Phase-Change Memory," in IEEE Transactions on Knowledge and Data Engineering, vol. 25, No. 12, pp. 2841-2853, Dec. 2013, doi: 10.1109/TKDE.2013.35. (Year: 2013).*

"European Application Serial No. 23785139.9, Response filed May 19, 2025 to Communication pursuant to Rule 161(1) and 162 EPC mailed Nov. 19, 2024", 28 pages.

"International Application Serial No. PCT/US2021/056855, International Preliminary Report on Patentability mailed May 11, 2023", 6 pgs.

"International Application Serial No. PCT/US2021/056855, International Search Report mailed Feb. 10, 2022", 3 pgs.

"International Application Serial No. PCT/US2021/056855, Written Opinion mailed Feb. 10, 2022", 5 pgs.

"International Application Serial No. PCT/US2022/032812, International Preliminary Report on Patentability mailed Feb. 22, 2024", 6 pgs.

"International Application Serial No. PCT/US2022/032812, International Search Report mailed Sep. 23, 2022", 3 pgs.

"International Application Serial No. PCT/US2022/032812, Written Opinion mailed Sep. 23, 2022", 4 pgs.

"International Application Serial No. PCT/US2023/012621, International Search Report mailed Jun. 16, 2023", 3 pgs.

"International Application Serial No. PCT/US2023/012621, Written Opinion mailed Jun. 16, 2023", 3 pgs.

Agarwal, C R, et al., "Rebound: Scalable checkpointing for coherent shared memory", 38th Annual International Symposium on Computer Architecture (ISCA), San Jose, CA, USA, (2011), 153-164.

Bhattacharyya, Abhishek, et al., "NvMR: Non-Volatile Memory Renaming for Intermilent Computing", 2022 Association for Computing Machinery ACM ISBN, (Jun. 18-22, 2022), 13 pages.

Chou, Chiachen, et al., "CAMEO:A Two-Level Memory Organization with Capacity of Main Memory and Flexibility of Hardware-Managed Cache", 2014 47th Annual IEEE/ACM International Symposium on Microarchitecture, (2014), 12 pgs.

Dong, X, et al., "Leveraging 3D PCRAM technologies to reduce checkpoint overhead for future exascale systems", Proceedings of the Conference on High Performance Computing Networking, Storage and Analysis, (2009), 13 pgs.

Ghosh, A, et al., "Checkpoint based multi-version concurrency control mechanism for remote healthcare system", International Conference on Advances in Computing, Communications and Informatics (ICACCI), Jaipur, India, (2016), 382-389.

Lee, E, et al., "On-Demand Snapshot: An Efficient Versioning File System for Phase-Change Memory", IEEE Transactions on Knowledge and Data Engineering, vol. 25, No. 12, (Dec. 2013), 2841-2853.

Lee, S W, et al., "Transactional In-Page Logging for multiversion read consistency and recovery", IEEE 27th International Conference on Data Engineering, Hannover, Germany, (2011), 876-887.

Leis, V, et al., "Exploiting hardware transactional memory in main-memory databases", IEEE 30th International Conference on Data Engineering, (2014), 12 pgs.

Mittal, S, et al., "A Survey of Software Techniques for Using Non-Volatile Memories for Storage and Main Memory Systems", IEEE Transactions on Parallel and Distributed Systems, vol. 27, No. 5, (May 1, 2016), 1537-1550.

Seshadri, Vivek, et al., "RowClone: Fast and Energy-Efficient In-DRAM Bulk Data Copy and Initialization", 2013 46th Annual IEEE/ACM International Symposium on Microarchitecture (MICRO), (2013), 13 pgs.

Shrira, L, et al., "SNAP: efficient snapshots for back-in-time execution", 21st International Conference on Data Engineering Tokyo, Japan, (2005), 434-445.

Singh, A, et al., "JASS: A Tunable Checkpointing System for NVM-Based Systems", IEEE 30th International Conference on High Performance Computing, Data, and Analytics (HiPC), Goa, India, (2023), 164-173.

Zhang, X, et al., "A Lightweight Snapshot-based Algorithm for Software Transactional Memory", The 9th International Conference for Young Computer Scientists, Hunan, China, (2008), 1254-1259.

"International Application Serial No. PCT US2023 012621, International Preliminary Report on Patentability mailed Oct. 17, 2024", 5 pages.

"European Application Serial No. 22856371.4, Response filed Sep. 27, 2024 to Communication Pursuant to Rules 161(2) and 162 EPC mailed Mar. 27, 2024", with English Claims, 7 pages.

"European Application Serial No. 22856371.4, Extended European Search Report mailed Nov. 5, 2024", 6 pages.

"European Application Serial No. 23785139.9, Extended European Search Report mailed Feb. 20, 2026", 12 pages.

Cai, Miao, "Hoop efficient hardware-assisted out-of-place update for non-volatile memory", Proceedings of the ACM SPEC International Conference on Performance Engineering, ACMPUB27, New York, NY, USA, May 30, 2020, pp. 584-596.

Jeong, Jungi, "Efficient Hardware-Assisted Logging with Asynchronous and Direct-Update for Persistent Memory", 51st Annual IEEE ACM International Symposium on Microarchitecture Micro, IEEE, Oct. 20, 2018, pp. 520-532.

Joshi, Arpit, "Atom Atomic Durability in Non-volatile Memory through Hardware Logging", Feb. 4, 2017, pp. 361-372.

* cited by examiner

ADAPTIVE CONTROL FOR IN-MEMORY VERSIONING

PRIORITY APPLICATION

This application is a continuation of U.S. application Ser. No. 17/970,132, filed Oct. 20, 2022, which is incorporated herein by reference in its entirety.

TECHNICAL FIELD

Embodiments pertain generally to memory devices. Some embodiments generally relate to adaptive controls for in-memory versioning of data stored on a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
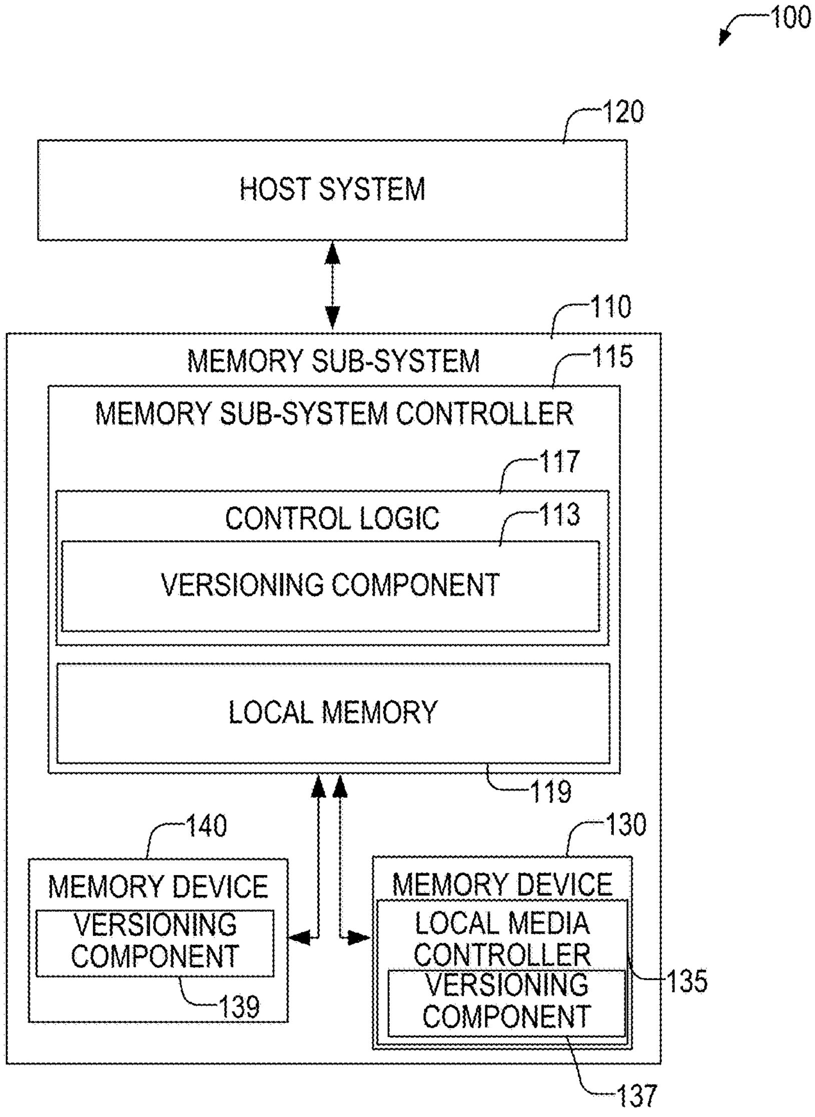
FIG. 1 illustrates an example computing system that includes a memory sub-system, in accordance with some examples of the present disclosure.

Memory systems may implement in-memory versioning in which the memory system stores copies of previous values of data to establish checkpoints having known-good values in memory locations, and may implement procedures to rollback such memory locations to the known-good values in the case of errors. For example, a checkpoint operation establishes a known-good value that is saved in an alternate memory location. After the checkpoint operation, various other memory operations may change the known-good value in a working memory location. Rollback restores the known-good value in the alternate memory location. Subsequent checkpoint operations may establish a new known-good value. Implementing this checkpointing at the memory device serves as an improvement to software-based checkpointing and rollback as the memory device may do this faster and more efficiently.

In some examples, to implement in-memory versioning, the memory device allocates or assigns two or more memory locations within the memory device to a single corresponding memory request address. One memory location stores the known-good value of the request address as of the time of a most recent or last commit operation. The other memory location stores the working copy—that is, it stores the updated value, which reflects to the checkpoint value, since the last commit or rollback operation. In some examples, more than two memory locations may be used to store respective multiple past versions of the data and a working copy for multiple checkpointing operations. The physical addresses of the first and second memory locations may be derivable from each other. That is, the second memory location and the first memory location can be separated by a known offset. This makes finding corresponding memory addresses simple. In some examples, the physical addresses of one of the corresponding memory locations may correspond to the request address.

Within such a system there can be two modes. In a first mode, called Zero Copy (ZC) mode, the checkpoint location and the working copy location changes between each checkpoint. This avoids the need to copy a value from one memory location to another memory location. A metadata field for each memory location stores a select field that indicates which memory location is the working copy and which is the backup. To handle an incoming read command, the memory device must first check metadata associated with the request address. In particular the memory device checks the select metadata(S) field to determine the working copy location. The read command is then serviced from the location indicated by the select metadata. For write commands, the memory system first checks to determine whether another field in the metadata, the dirty (D) field, is set. The D field indicates whether the memory location was updated since the last checkpoint (i.e., either a commit or rollback instruction). If the D field indicates that the memory location was updated more recently than the last checkpoint, then the memory system writes to the memory location indicated by the S field. If the D field is not set, then it indicates this is a first write to the memory location since a commit or rollback. In this case, the memory system changes the S field to point to the other memory location, sets the D field to indicate that the memory location was updated more recently than the last checkpoint, and then writes the data in the location indicated by the new S field. In some examples, the S and D fields are bits and may be referred to as an S bit or bits and a D bit or bits. In these examples, changing the S field may comprise inverting the S field and changing the D field may comprise inverting the D field. On a commit operation, if the D field is set, then the D field is cleared and the select field is kept the same. On a first write to this memory location after the commit, the S field will be switched, and the committed value will be preserved. On rollbacks, the S field is changed to point to the other memory location and the D field is cleared.

In a second mode, called Direct Copy (DC), the active working copy is always found in a particular one of the memory locations (the working location), removing the need to look up the S field beforehand. In some examples, the S field may be unused in this mode. The memory device reads the working location on a read request. For write requests, the memory device checks the dirty field. If the dirty field is not set, then the working location is copied to the checkpoint location and the R field is set. On writes to already modified data, the working location is written. On Commit operations, the dirty field is reset. On Rollback operations, if the dirty field is not set, no action is taken. If the dirty field is set, then the working location is copied over to the checkpoint location and the dirty field is reset.

Due to varying metadata and memory location accesses per incoming read or write request, different modes may work the best depending on the read/write ratio of requests to each request address. In ZC mode, the first write and rollback operations after a checkpoint may require no data copying (e.g., and can include only metadata updates), but the S bit lookup to find the working location adds to read latency. Read latency may impact processor performance more than writes, which can be buffered, although both data locations could be read speculatively while checking the S field. In DC mode, there is no S field lookup latency for reads, but the first write and rollback operations require copying between memory locations, increasing runtime bandwidth overhead.

Disclosed in some examples are systems, devices, machine-readable mediums, and methods for customizing an in-memory versioning mode for each request address according to a predicted access behavior to optimize the memory device performance. Usage data in a previous time period may be utilized along with policy rules to determine whether to configure a particular memory address as a ZC mode or DC mode. For example, request addresses that are read frequently may be configured as DC mode to reduce the read latency penalty. This improves the functioning of the memory system by reducing read latency for memory addresses that are frequently read but written to less frequently and reduces write latency for memory locations that are frequently written to, but not read as frequently.

Additionally, with traditional methods of in-memory versioning, the capacity overhead of allocating two separate memory locations for each request address configured for in-memory versioning may be wasteful. That is, a relatively small number of request addresses may be written to since the last checkpoint, thus allocating two or more physical locations for each of these addresses when those locations are not utilized may not be efficient in all scenarios.

Also disclosed in some examples are systems, devices, machine-readable mediums, and methods for sparse mode in-memory versioning. In this mode, the request address metadata is cached in volatile memory of the memory device. Based upon the selected mode (ZC or DC), the original address or its secondary are accessed in accordance with the in-memory versioning scheme. Instead of using a simple offset between the physical addresses of the working and checkpoint locations, additional memory locations are allocated only as needed (e.g., upon a first write after a checkpoint) and a mapping table may be used to indicate the secondary memory location address. This improves the functioning of the memory system by reducing wasted memory space.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

FIG. 1 illustrates an example computing system 100 that includes a memory sub-system 110, in accordance with some examples of the present disclosure. The memory sub-system 110 can include media, such as one or more volatile memory devices (e.g., memory device 140), one or more non-volatile memory devices (e.g., memory device 130), or a combination of such devices.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, “coupled to” or “coupled with” generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface such as a bus or interconnect. Examples of a physical host interface include, but are not limited to one or more of: a Serial AT Attachment (SATA) interface, a Peripheral Component Interconnect express (PCIe) interface, Universal Serial Bus (USB) interface, Fiber Channel, Small Computer System Interface (SCSI), Serial Attached SCSI (SAS), Universal Flash Storage (UFS), Non-Volatile Memory Express (NVMe), Compute Express Link (CXL), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM). Some examples of non-volatile memory devices (e.g., memory device 130) include a negative-and (NAND) type flash memory and write-in-place memory, such as a three-dimensional cross-point (“3D cross-point”) memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLCs, can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a control logic 117 such as a hardware processor configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, instructions, in the form of versioning component 113 may be stored in local memory 119 and, when executed by the control logic 117, may implement the functions of the versioning component 113 as herein described. In some examples, the versioning component 113 may be specific arrangements of hardware components within the control logic 117 such as various arrangements of transistors and other integrated circuit components.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a versioning component 113 that manages in-memory versioning of data stored on one of the memory devices 130, 140 (e.g., maintaining versions of data stored on individual rows of the memory devices 130, 140). For some embodiments, the versioning component 113 enables the memory sub-system 110 to maintain different versions of data for different sets of physical memory addresses (e.g., different rows) of one of the memory devices 130, 140. The versioning component 113 can enable the memory sub-system 110 (via the memory sub-system controller 115) to use stored in-memory versioning data to facilitate a rollback operation/behavior, a checkpoint operation/behavior, or both as described herein with respect to an individual set of physical request memory addresses (e.g., row) of one of the memory devices 130, 140. Where the memory sub-system 110 implements a transactional memory functionality or features, the versioning component 113 can enable the memory sub-system 110 (via the memory sub-system controller 115) to use stored in-memory versioning data to facilitate rollback of a memory transaction (e.g., rollback a failed memory transaction), commit (e.g., checkpoint) of a memory transaction, or handling of a read or write command associated with respect to a memory transaction (e.g., detect and resolve a conflict caused by a write command) as described herein. As used herein a memory request address may be a physical memory address that is included in a memory request (e.g., a load or store) and/or may be a physical address produced after conversion from one or more virtual addresses. The memory request address may then be selectively converted into a different address by the versioning component 113 to service the memory request dependent on the active in-memory versioning mode and the metadata of the request address.

As noted, the versioning component 113 may implement functions related to in-memory versioning. For example, tracking and changing metadata such as the select and dirty fields, processing commit and rollback commands, allocating memory for the in-memory versioning and the like. The versioning component 113 may also work with versioning components within the memory devices, such as versioning components 137 and 139. That is, the versioning component 113 can be wholly or partially implemented as part of the local media controller 135 of the memory device 130. In this way, the versioning component 113 can enable at least one feature described herein to be implemented on the memory devices 130 or 140 independent of the memory sub-system controller 115. For example, the versioning component 113 may perform certain operations related to in-memory versioning and versioning components 137 and 139 may perform other operations related to in-memory versioning. In other examples, all operations related to in-memory versioning may be performed by the versioning components 137 and 139. In still other examples, all operations related to in-memory versioning may be performed by only the versioning component 113.

The versioning component 113 and/or the versioning components 137 and 139 may track access history for one or more request addresses using an access profile data structure. In some examples, the access profile data structure may comprise one or more access counters, bloom filters, or other data structures. For example, when a particular request address is written, a bloom filter may map the request address to a particular bit of an array, e.g., by using the physical memory address. The bit is then set. When the versioning component 113 later queries the bloom filter for that particular address, the versioning component 113 determines that the bit is set and thus that the address was likely written to in the last checkpoint interval. In some examples, the bloom filter may track reads instead of writes.

In yet other examples, separate ones of multiple bloom filters may be used to track both reads and writes. In still yet other examples, two bloom filters may be used per access type that is tracked. A first bloom filter of the pair tracks the access type for the current checkpoint period and a second bloom filter that stores information about the accesses that occurred in the previous checkpoint. That is, in a first checkpoint, a first bloom filter tracks the accesses to request addresses during the first checkpoint. During the second checkpoint, a second bloom filter may track the accesses to request addresses during the second checkpoint and the first bloom filter is used to predict whether a given memory location should be ZC or DC during the second checkpoint (e.g., based upon the accesses in the first checkpoint). During the third checkpoint period the first and second bloom filters switch roles and the first bloom filter is used to track accesses during the third checkpoint period and the second bloom filter is used to predict whether a given physical address should operate according to ZC or DC mode.

While in some examples, bloom filters may be used to track whether a particular memory location was accessed, in other examples, access counters may be utilized. Access counters may provide a number of times a memory location was written to and/or read from. This may be used to implement in-memory version mode selection policies which are based upon specific access counts (e.g., choosing ZC mode when the number of read accesses exceeds a specified threshold). In still other examples, access counters may be implemented using counting bloom filters, which may trade off counter storage capacity for counter accuracy.

As noted, whether a request address is assigned as a ZC or DC mode for a given checkpoint period is determined using selection logic (e.g., rules), with the bloom filter or event counter statistics as input. Various in-memory versioning mode selection logic can be used based on the type of information the hardware tracking mechanism can provide. For example, ZC mode may be selected if one or more of the following is identified:

1. The request address is written in the previous checkpoint interval (e.g., as tracked by bloom filters).
2. The request address is written, AND the line is not read in the previous checkpoint interval (e.g., as tracked by bloom filters).
3. The request address is written, OR the line is not read in the previous checkpoint interval (e.g., as tracked by bloom filters).
4. The request address is written in the previous checkpoint interval (e.g., as tracked by access counters).
5. The request address is written in the previous checkpoint, AND the R/W ratio is less than 2 since the previous commit, or within a previously elapsed period of time (e.g., as tracked by access counters).
6. The request address is written in the previous checkpoint, OR the R/W ratio is less than 2 throughout the program (e.g., as tracked by access counters).

As noted, DC in-memory versioning mode incurs a high copy overhead if the request address is written for the first time at the checkpoint interval, and ZC mode incurs a metadata state check overhead every time a read or write access is issued. The above examples of selection logic seek to minimize the various costs of each mode based upon the access patterns. The selection logic may be implemented using hardware or software. In examples in which hardware bloom filters are used, some selection logic may require additional hardware. For example, selection logic number two requires two separate bloom filters to track read and write access. This results in four bloom filters when implemented with double buffering bloom filters. In addition, using specific access ratios (e.g., choosing ZC mode when the ratio of read accesses exceeds the ratio of write accesses by a specified ratio threshold) may require additional hardware.

Figure 2:
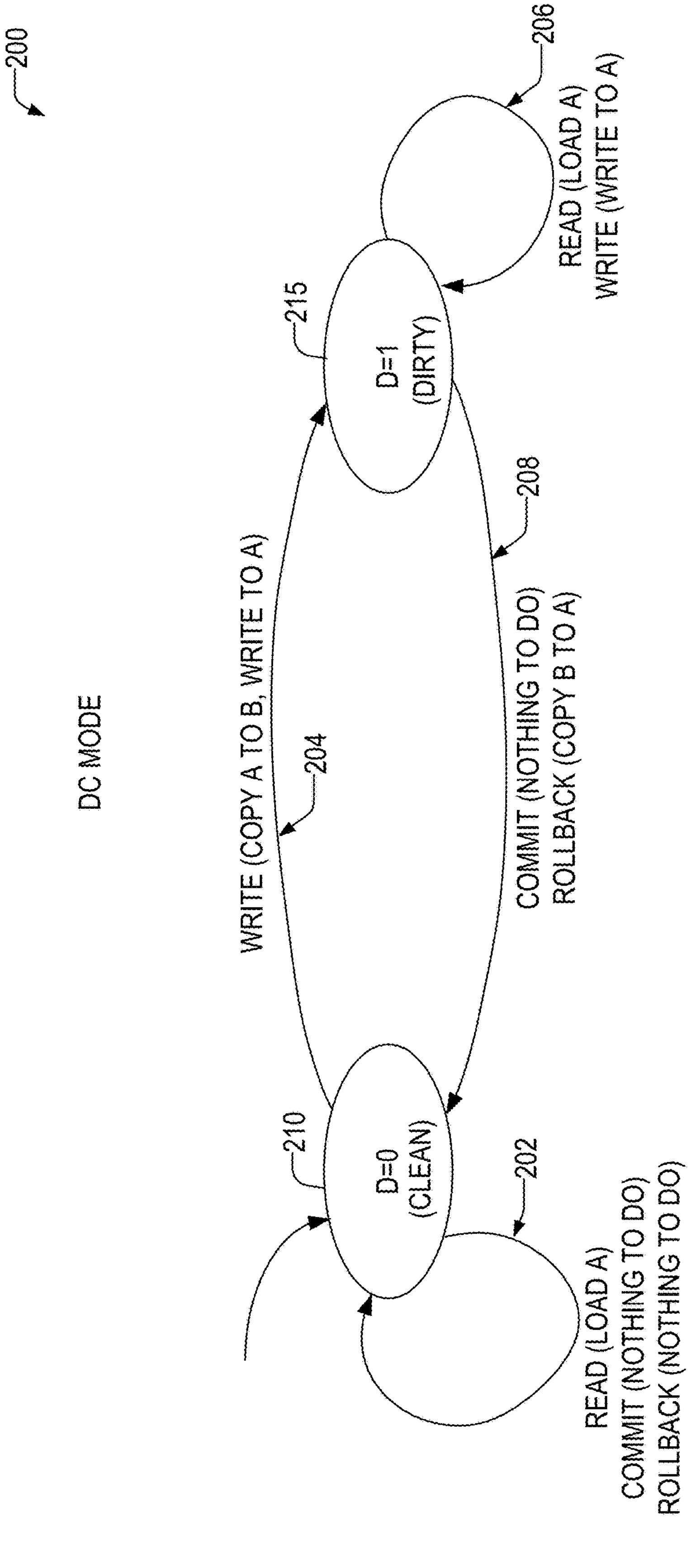
FIG. 2 illustrates a state diagram of a direct copy in-memory versioning mode according to some examples of the present disclosure.

FIG. 2 illustrates a state diagram 200 of a DC in-memory versioning mode according to some examples of the present disclosure. First state 210 is when the request address is clean with the dirty metadata field indicating that the request address has not yet been written to during the current checkpoint interval. In this state, a read operation, commit operation, or rollback operation 202 remains in the first state 210. For read operations, the memory device reads the first corresponding location (location A) and returns the value at that location to the requester. On commit or rollback operations, there is nothing to be done (e.g., no operation).

On a write operation 204, the memory device copies the value in location A to the other location corresponding to the request address, location B, and services the write request to location A. The dirty field is then set and the state transitions to a second state 215. Once in the second state 215, read operations and write operations 206 remain in the second state 215. Read operations read location A, write operations write to location A.

Commit or rollback operations transition 208 back to the first state 210 from the second state 215. On a commit operation, nothing needs to be done except setting the dirty field to clean. Upon the first write after the commit operation, the value that is in memory location A is copied over to memory location B prior to the write so the known-good value (after the commit operation) is protected. For a rollback operation, the value that was in memory location B—the known good value—is copied back over to location A.

Figure 3:
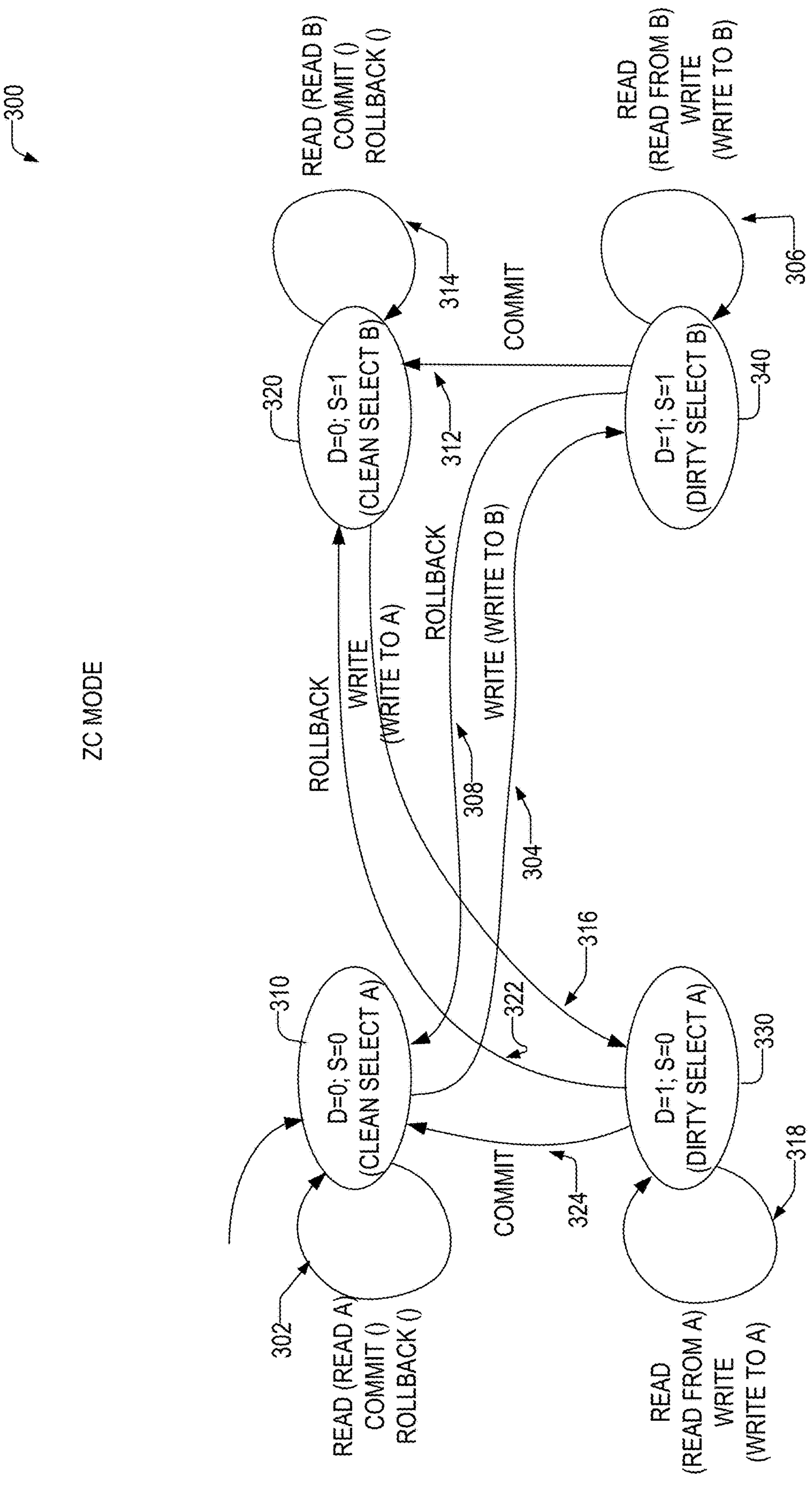
FIG. 3 illustrates a state diagram of a zero copy in-memory versioning mode according to some examples of the present disclosure.

FIG. 3 illustrates a state diagram 300 of a ZC in-memory versioning mode according to some examples of the present disclosure. Operation begins at state one 310 where the dirty field is clear and the select bit points at memory location A. In this state, reads, commits, or rollback operations 302 remain in this state. On a read command, the memory device returns the value at memory location A (which is what the select field points at). Commit and rollback operations have no effect. On a write operation 304, the state transitions to state four 340, the dirty field is set, and the select field is changed to point to memory location B. The write command is serviced by writing to memory location B.

Once in state four 340, read operations, and write operations 306 stay in state four. On a read operation, the memory device reads the value from memory location B (as indicated by the select field), and write command writes to memory location B (as indicated by the select field). Upon a rollback operation 308, flow transitions from state four 340 back to state one 310; the dirty field is cleared, and the select bit is changed to point back at memory location A. Upon a commit operation 312, the state transitions from state four 340 to state two 320.

In state two, the dirty field is cleared, and the select field remains pointed at memory location B. In state two, the read, commit, and rollback operations 314 do not change states. During a read operation, the memory device reads the value from location B. Commit and rollback operations do nothing as there has been no change to the value stored in memory location B since the last checkpoint (e.g., commit or rollback). On a write operation 316, the state transitions from state two 320 to state three 330. The write operation writes to memory location A, the dirty field is set, and the select field is changed to point to memory location A.

In state three 330, read operations and write operations 318 do not transition state. On read operations, the value is read from location A and for write operations, the value is written to location A. On a rollback operation 322, the state transitions back to state two 320. At state two, the dirty field is cleared and the select field is changed to point to location B. On commit operations 324, state transitions to state one 310. The dirty field is cleared and the select bit stays the same.

Figure 4:
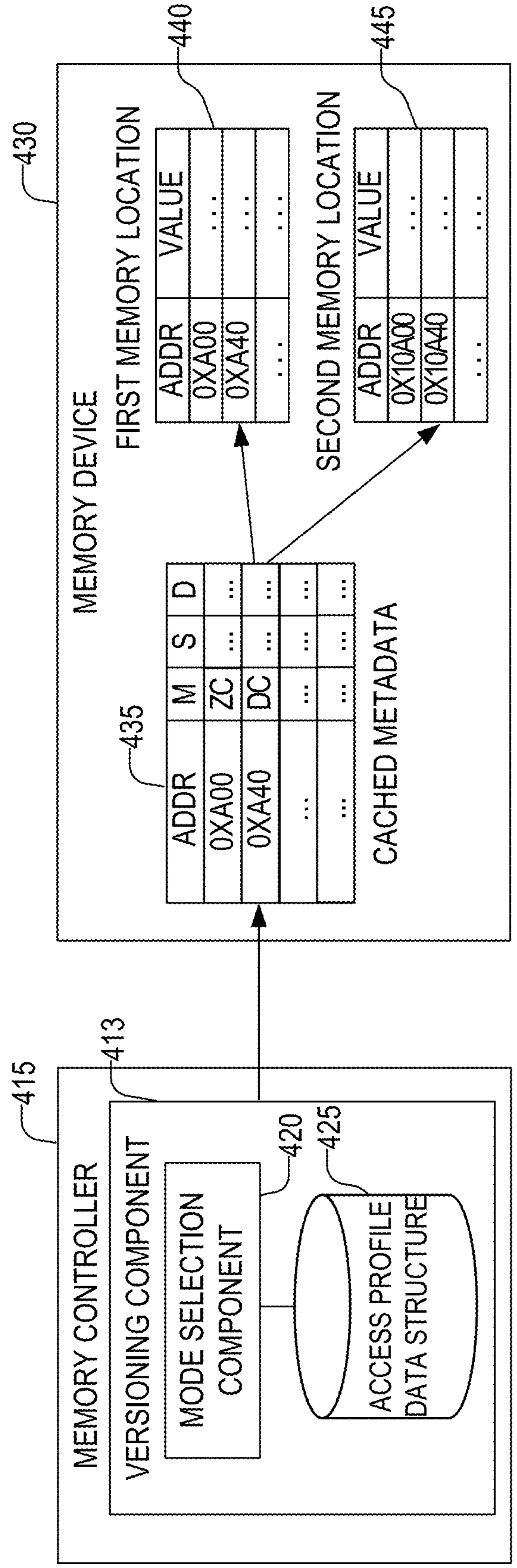
FIG. 4 illustrates a logical diagram of a memory controller with a versioning component selecting a direct copy or zero copy mode using a dense mode according to some examples of the present disclosure.

FIG. 4 illustrates a logical diagram of a memory controller 415 with versioning component 413 selecting a DC or ZC in-memory versioning mode in a dense mode according to some examples of the present disclosure. While shown separately, the memory controller and memory devices may be in a same memory module package. For example, the memory may be used as a CXL device. In some examples, the memory controller 415 and versioning component 413 may be examples of the memory sub-system controller 115 and versioning component 113. In some examples, the memory device 430 may be an example of the memory device 130 or 140. At the memory controller 415, an access profile data structure 425 comprising one or more access counters and/or bloom filters are used by the mode selection component 420 of the versioning component 413 as input to selection logic to select whether a memory access should use DC or ZC mode.

The memory controller 415 sends the predicted access type (DC or ZC) to the memory device 430 along with the memory request. At the memory device 430, metadata 435 for multiple memory locations may be cached in volatile memory (e.g., Static Random Access Memory). The memory device 430 probes the metadata for the request address to determine the appropriate memory location. The original address in the original locations 440 or its secondary address in the secondary locations 445 are accessed in accordance with the in-memory versioning state machine based upon the mode from the memory controller 415 and the metadata. If a secondary access is required, then the secondary access address may be generated by adding a constant offset to the original address.

Note that before the memory access, the in-memory versioning mode can be checked against the already selected mode for the same request address. If the mode is the same, then the memory access is handled according to the state machine (e.g., either FIG. 2 or FIG. 3). If the mode provided by the memory controller does not match the current mode, then a corresponding mode change routine is called to update the mode of the request address. If the request address is in ZC mode, then the select flag is 0 and the target mode is DC then the state bits are updated to the reset states of DC mode (e.g., Mode=DC, Select=0, Dirty=unchanged). If the request address state is ZC and S==1, and the target mode==DC, then the data in the secondary address is copied into the original address to maintain the correctness of the state machine. If the dirty field is set, then the data in the original address may be copied to the secondary address. In these cases, the state becomes: (M=DC, S=0, D=unchanged). If the current line state is DC, and the target mode is ZC, then the metadata fields are updated to the initial states of ZC mode (M=ZC, S=0, D=unchanged).

FIG. 4 illustrates operation of dense mode. In dense mode, a dedicated region with the same capacity as the main memory access region is allocated to store the secondary value (e.g., in ZC or DC mode). If a secondary access is required, then the secondary access address is generated by adding a constant offset to the original address. In the sparse mode, the memory for the secondary access location is not allocated until it is needed.

Figure 5:
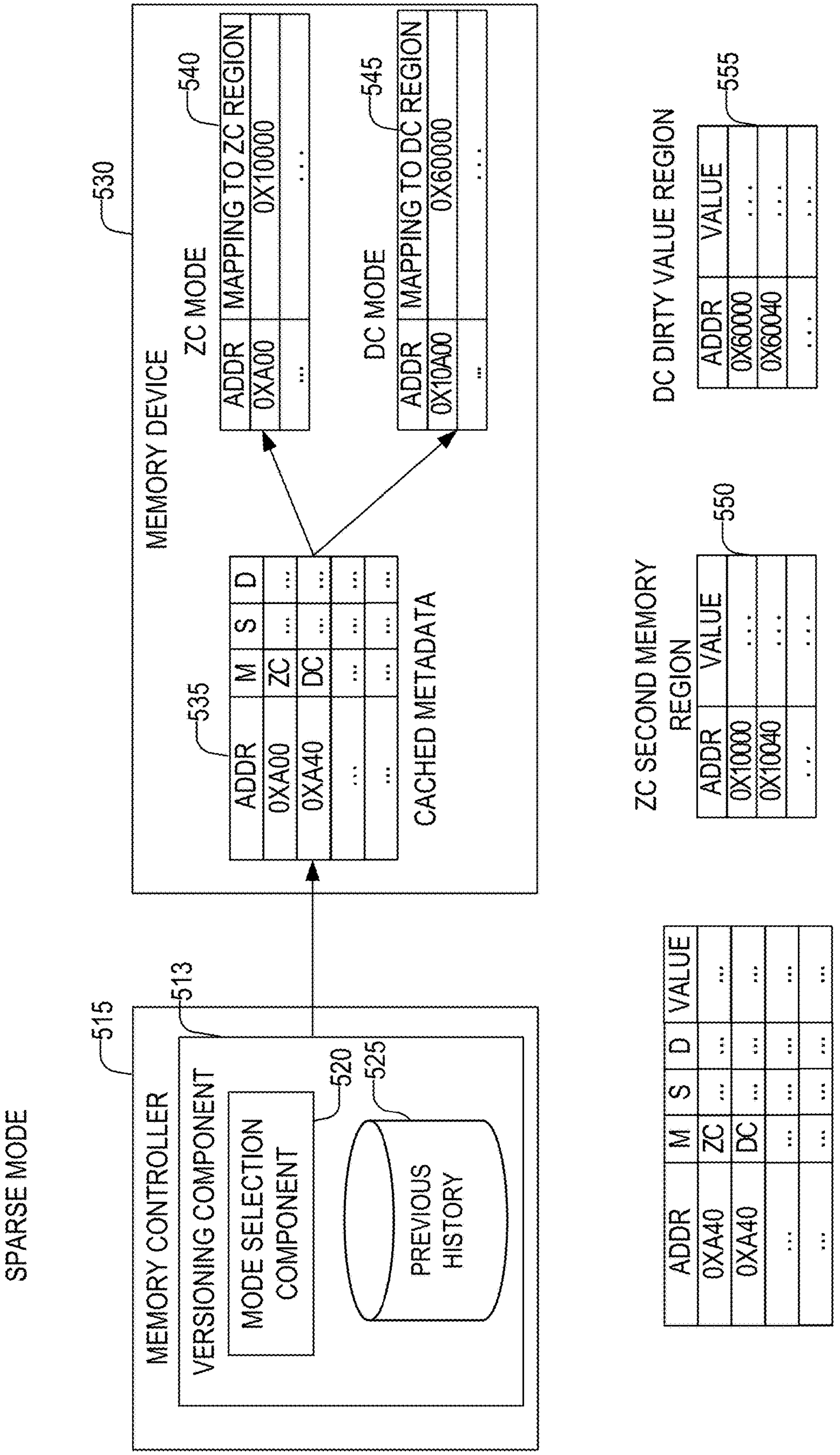
FIG. 5 illustrates a logical diagram of a memory controller with the versioning component selecting a direct copy or zero copy mode using a sparse mode according to some examples of the present disclosure.

FIG. 5 illustrates a logical diagram of a memory controller 515 with the versioning component 513 selecting a DC or ZC mode using a sparse mode according to some examples of the present disclosure. In some examples, the memory controller 515 and versioning component 513 may be examples of the memory sub-system controller 115 and versioning component 113. In some examples, the memory device 530 may be an example of the memory device 130 or 140.

At the memory controller 515, an access profile data structure 525 comprising one or more access counters and/or bloom filters can be used by the mode selection component 520 to predict whether a memory access should use DC or ZC mode, for example based on a performance metric for each configuration. The memory controller 515 sends the predicted access type (DC or ZC) to the memory device 530 along with the memory request. At the memory device 530, metadata 535 may be cached in volatile memory (e.g., Static Random Access Memory). The memory device 530 probes the metadata of the request address for the selected memory location. The original address in the original locations or its secondary address in the secondary locations are accessed in accordance with the in-memory versioning state machine based upon the mode from the memory controller 515 and the metadata. If a secondary access is required, and the memory device is in ZC mode, the secondary access address may be determined by reference to the ZC mode table 540 which points to the location in the second memory region 550. If a secondary access is required, and the memory device is in DC mode, the secondary access address may be determined by reference to the DC mode table 545 which points to the location of the dirty value region 555.

If the DC or ZC mode indicated by the memory controller is a mismatch, then the mapping tables need to be updated to reflect the changed mode. If a request address that is marked as ZC is updated to DC, then the address in the ZC remapping table is evicted and the address is inserted into the DC remapping table. If the request address is marked as DC mode and is updated to ZC mode, then the address in the DC mapping table is evicted and the address is inserted into the ZC mapping table.

If the DC/ZC remapping region becomes full, then a checkpoint may be committed. On a checkpoint commit command, due to a full remapping region, dirty data values in the DC dirty value region and ZC secondary memory region are copied back to their original address (ADDR) in main memory. Then, both DC and ZC remapping tables are cleared and metadata bits in DRAM and cache at main memory are reset. The ZC secondary value region and DC dirty value region can be allocated to any memory module in different failure domains. The size of ZC and DC secondary value region can be arbitrarily chosen. The choice of capacity size may affect the frequency of committing a checkpoint due to capacity limit. The capacity size also affects the number of entries in the added SRAM component and thus the latency overhead of memory requests.

Figure 6:
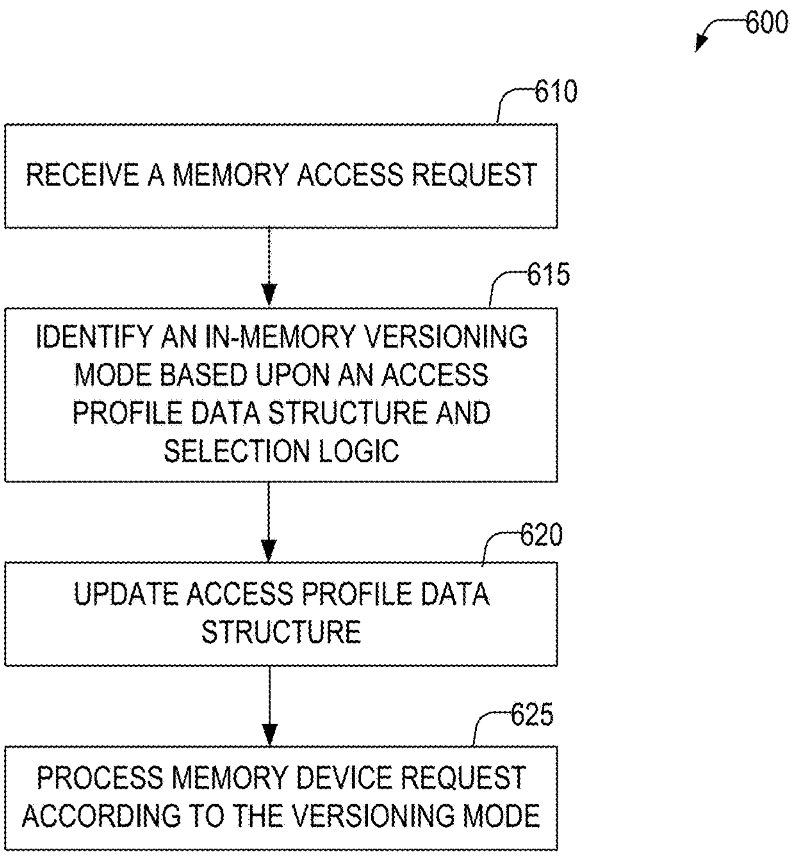
FIG. 6 illustrates a flowchart of a method of a dynamic in-memory versioning system according to some examples of the present disclosure.

Turning now to FIG. 6, a flowchart of a method 600 of a dynamic in-memory versioning system is shown according to some examples of the present disclosure. At operation 610, the system may receive a memory access request for a request address. The memory access request may be a read or write request. At operation 615, the memory system may identify an in-memory versioning mode based upon an access profile data structure and selection logic.

The access profile data structure may store past usage history of one or more request addresses, such as the request address that is the subject of the memory access request. In some examples, the access profile data structure may store both access information for a current checkpoint or time period and access information for a previous checkpoint or time period. In these examples, the system may use the access information for the previous checkpoint or time period at operation 615 to identify the in-memory versioning mode. The access information for the current checkpoint or time period may be updated then at operation 620 to reflect the access request received at operation 610. In some examples, during a next checkpoint or time period, the portions of the access profile data structure that store the previous checkpoint or time period may be erased and used to store the next checkpoint or time period while the portions of the access profile data structure that store the current checkpoint or time period are locked and used during the next checkpoint or time period to select the in-memory versioning mode.

In some examples, the access profile data structure may be one or more pairs of bloom filters. One bloom filter in the pair is updated during the checkpoint period to record which request addresses are accessed during the current checkpoint interval. The other bloom filter stores the previously recorded bloom filter state, and services lookups to set which mode should be used for a request address. The two bloom filters switch after every commit interval. That is, a first bloom filter is used to select the in-memory versioning mode as it stores the history of accesses in the previous checkpoint interval and the second bloom filter records accesses during the current interval. For the next interval the bloom filters swap such that the second bloom filter is used to select the in-memory versioning mode and the first bloom filter records accesses during the next interval. In some examples, each access type that the selection logic uses (e.g., read accesses, write accesses) utilizes a separate pair of bloom filters to track the access type.

The access profile data structure in some examples may be access counters that may count a number of accesses of one or more access types. For example, every time a read request is issued for a given memory location within a particular checkpoint interval, the counter is incremented. These access counts may be used to implement complex selection logic that considers not only if the memory location was accessed in a particular way, but how often.

As noted, the access profile data structure may track accesses on a per-checkpoint basis. In other examples, the access profile data structure may track accesses on a sliding window scale. That is, accesses older than a specified time period may be removed from the access profile data structure. In order to accomplish this, the access profile data structure may store a timestamp of when the access occurred. Periodically, or upon receiving a new access request, old accesses may be cleared out.

Selection logic may be simple comparisons or thresholds, if-then rules, ratios, or the like. The selection logic may be hard-coded into firmware of the memory device, hardware of the memory device, or the like. In other examples, the selection logic may be selectable and customizable by an application executing on a computing system in which the memory device is present.

At operation 620, the system may update the access profile data structure with the memory access corresponding to the memory access request. For example, by updating the appropriate bloom filter, access counter, or the like.

At operation 625, the system may process the memory device request according to the selected versioning mode. In some examples, this may be according to FIG. 2 or 3 depending on the versioning mode. In some examples, if the selected mode at operation 615 is a mode change, then in some examples, various operations may be performed to change the mode of the memory location.

If the memory system is operating in dense mode, and the current location in-memory versioning type is ZC (the M field of the metadata is set to indicate ZC) and the target mode is DC, if S==0, then the state bits are updated to the reset states of DC mode—that is, M=DC, S=0, and D=unchanged. If the current line state is ZC and S==1, and the target mode is DC, then the data in the secondary address is copied into the original address to maintain the correctness of the state machine. In addition, if the dirty field indicates that data was written to the location, then the data in the primary address is copied to the secondary address. The state then becomes: (M=DC, S=0, D=unchanged). If the request address in-memory versioning state is DC mode and the target mode is ZC mode then the state metadata are updated to the initial states of the ZC mode (M=ZC, S=0, D=unchanged).

For sparse mode, if the request address is in ZC mode and is to be updated to DC mode, then the address in the ZC remapping table is evicted and the address in the DC remapping table is inserted. If the request address is a DC mode location and is to be updated to a ZC mode location, then the address in the DC remapping table is evicted and the address in the ZC remapping table is inserted.

Figure 7:
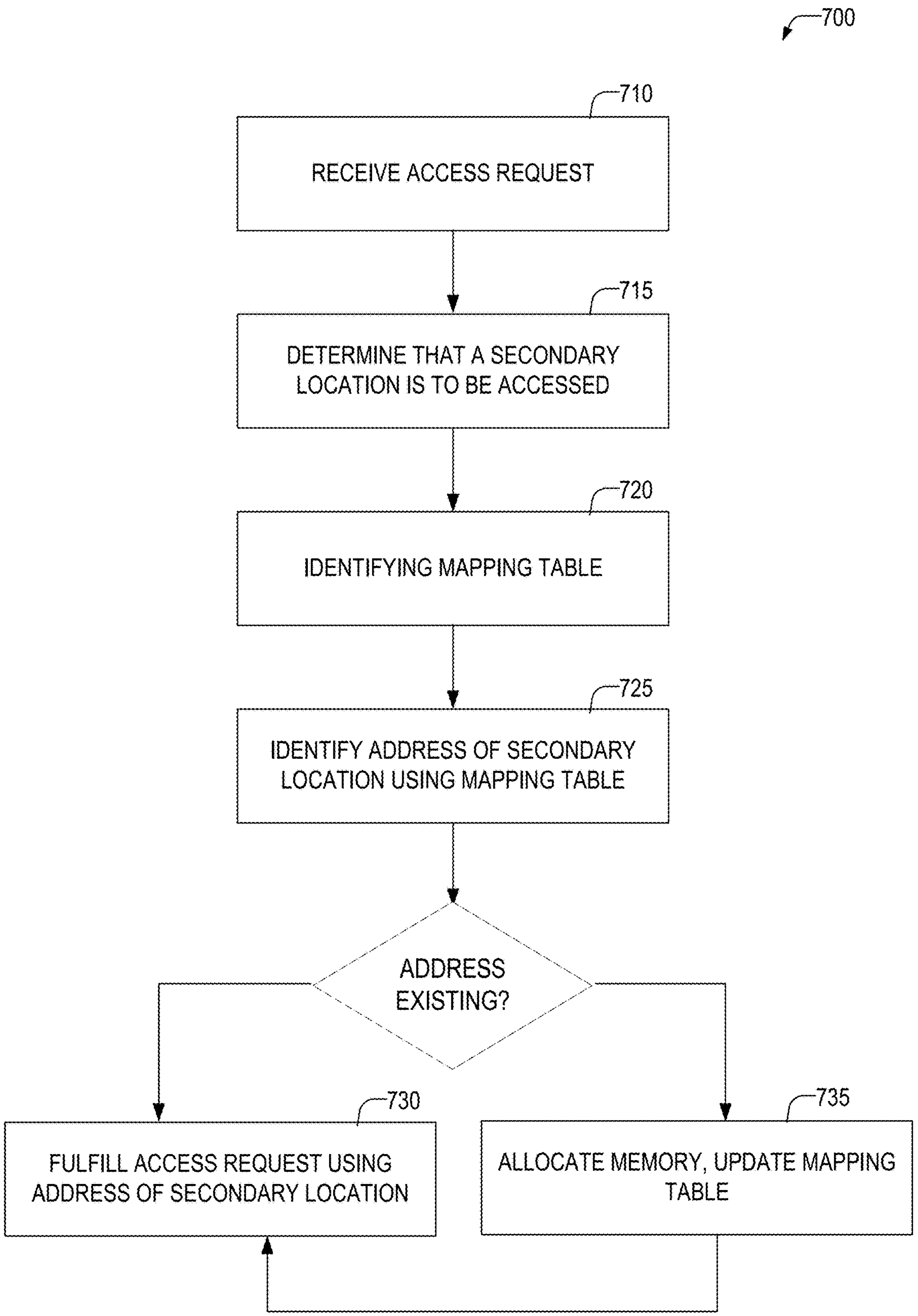
FIG. 7 illustrates a flowchart of a method of a memory system operating in a sparse mode according to some examples of the present disclosure.

FIG. 7 illustrates a flowchart of a method 700 of a memory system operating in a sparse mode according to some examples of the present disclosure. At operation 710 the system may receive an access request. For example, the access request can include a memory write or a memory read command or operation. At operation 715, the system may determine that a secondary address is to be accessed, for example when the request address referenced by the memory access request is in ZC mode and the select operation indicates that accesses of the particular type of access received are to be serviced by the secondary memory location. At operation 720 the appropriate mapping table is determined. In some examples, different mapping tables may be used for request addresses that are configured as DC mode than for locations configured as ZC mode. The appropriate mapping table may be determined using the mode of the particular memory location (which may be stored and/or indicated in metadata for the memory location).

At operation 725, the memory service may identify the secondary location using the mapping table. For example, for each primary location, the address of the secondary location may be listed. If the address is not valid or is non-existing, then at operation 735, the memory system may allocate memory for the secondary location and update the mapping table. Flow then proceeds to operation 730, which is where flow would proceed if the address was already existing. At operation 730, the access request may be fulfilled using an address of the secondary memory location.

Figure 8:
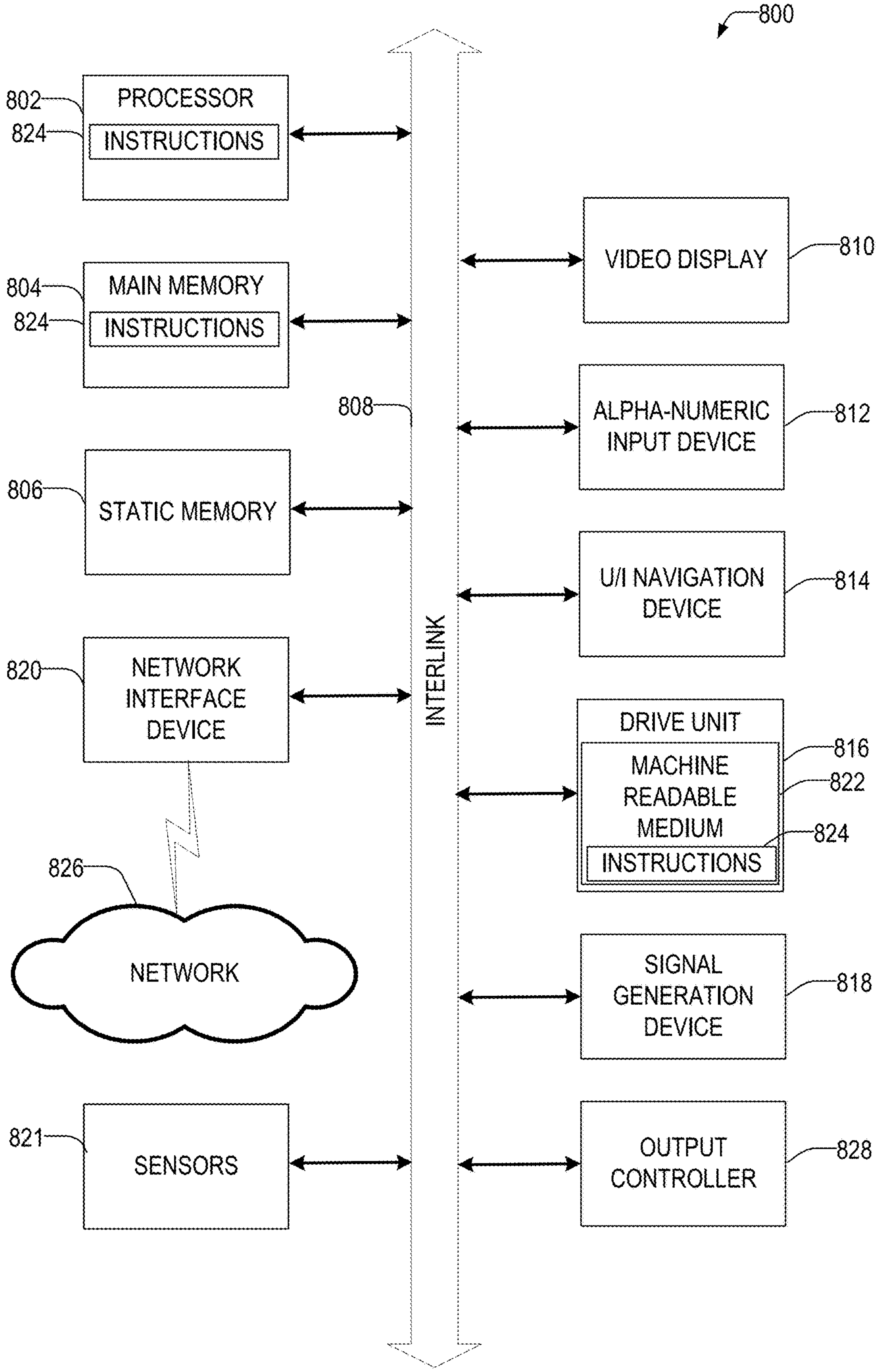
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a host device, memory device, memory system, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 800 may be or include components from FIGS. 1, 4, 5. Machine 800 may be configured to perform the state machines of FIGS. 2 and 3, and perform the methods of FIGS. 6 and 7.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a method comprising: receiving a memory access request for a memory location; responsive to receiving the memory access request, identifying an in-memory versioning mode for the memory location based upon an access profile data structure storing past access information for memory accesses and selection logic, the in-memory versioning mode either a direct copy mode or a zero copy mode, wherein the direct copy mode copying a working value from a first memory location of a pair of memory locations to a second memory location of the pair of memory locations on a first write operation after a commit or a rollback operation, the zero copy mode switching a value of a select field between the pair of memory locations upon a first write operation after a commit or rollback operation, wherein the value of the select field indicates a working location of the pair of memory locations; updating the access profile data structure based upon a memory access type corresponding to the memory access request; and processing the memory access request according to the identified versioning mode.

In Example 2, the subject matter of Example 1 includes, wherein identifying the in-memory versioning mode comprises: querying the memory location in the access profile data structure, the access profile data structure returning an indication of whether the memory location was written to in a previous checkpoint interval and wherein identifying the in-memory versioning mode comprises selecting a zero-copy mode if the indication indicates that the memory location was written to in a previous checkpoint interval.

In Example 3, the subject matter of Examples 1-2 includes, wherein the access profile data structure comprises a first bloom filter and a second bloom filter, the first bloom filter tracking memory accesses for a previous checkpoint and the second bloom filter tracking memory accesses for a current checkpoint and wherein identifying the in-memory versioning mode comprises: querying the memory location in the first bloom filter, the first bloom filter returning an indication of whether the memory location was written to or read from in a previous checkpoint interval and wherein identifying the in-memory versioning mode comprises selecting a zero copy mode if the indication indicates that the memory location was written to but not read in the previous checkpoint; and wherein updating the access profile data structure with the memory access type corresponding to the memory access request comprises updating the second bloom filter.

In Example 4, the subject matter of Examples 1-3 includes, wherein the access profile data structure comprises a first bloom filter and a second bloom filter, the first bloom filter tracking memory accesses for a previous checkpoint and the second bloom filter tracking memory accesses for a current checkpoint and wherein identifying the in-memory versioning mode comprises: querying the memory location in the first bloom filter, the first bloom filter returning an indication of whether the memory location was written to or read from in a previous checkpoint interval, wherein identifying the in-memory versioning mode comprises selecting a zero copy mode if the indication indicates that the memory location was written to or read in the previous checkpoint; and wherein updating the access profile data structure with the memory access type corresponding to the memory access request comprises updating the second bloom filter.

In Example 5, the subject matter of Examples 1~4 includes, wherein the access profile data structure comprises access counters, and wherein identifying the in-memory versioning mode comprises: querying the memory location in the access profile data structure, the access profile data structure returning an indication of a number of times the memory location was written to and read from in a previous checkpoint interval and wherein identifying the in-memory versioning mode comprises selecting a zero copy mode if a read/write ratio is less than a specified value; and wherein updating the access profile data structure with the memory access type corresponding to the memory access request comprises updating the access counters based upon a type of access corresponding to the memory access request.

In Example 6, the subject matter of Examples 1-5 includes, wherein the memory access request is a write request, and wherein the method further comprises: determining that a dirty field for a memory location corresponding to the memory access request indicates that the memory location has not yet been written to during a current checkpoint interval; responsive to determining that the dirty field indicates that the memory location has not yet been written to during the current checkpoint interval: allocating a working memory location; updating a mapping table with an address of the allocated working memory location; and writing the memory access request to the working memory location.

In Example 7, the subject matter of Examples 1-6 includes, wherein the memory access request is a write request, and wherein the method further comprises: determining that a dirty field for a memory location corresponding to the memory access request indicates that the memory location has been written to during a current checkpoint interval; responsive to determining that the dirty field indicates that the memory location has been written to during the current checkpoint interval: determining an address of a working memory location using a mapping table; and writing the memory access request to the working memory location.

Example 8 is a memory system comprising: a memory controller, configured to perform operations comprising: receiving a memory access request for a memory location; responsive to receiving the memory access request, identifying an in-memory versioning mode for the memory location based upon an access profile data structure storing past access information for memory accesses and selection logic, the in-memory versioning mode either a direct copy mode or a zero copy mode, wherein the direct copy mode copying a working value from a first memory location of a pair of memory locations to a second memory location of the pair of memory locations on a first write operation after a commit or a rollback operation, the zero copy mode switching a value of a select field between the pair of memory locations upon a first write operation after a commit or rollback operation, wherein the value of the select field indicates a working location of the pair of memory locations; updating the access profile data structure based upon a memory access type corresponding to the memory access request; and processing the memory access request according to the identified versioning mode.

In Example 9, the subject matter of Example 8 includes, wherein the operations of identifying the in-memory versioning mode comprises: querying the memory location in the access profile data structure, the access profile data structure returning an indication of whether the memory location was written to in a previous checkpoint interval and wherein identifying the in-memory versioning mode comprises selecting a zero-copy mode if the indication indicates that the memory location was written to in a previous checkpoint interval.

In Example 10, the subject matter of Examples 8-9 includes, wherein the access profile data structure comprises a first bloom filter and a second bloom filter, the first bloom filter tracking memory accesses for a previous checkpoint and the second bloom filter tracking memory accesses for a current checkpoint and wherein the operations of identifying the in-memory versioning mode comprises: querying the memory location in the first bloom filter, the first bloom filter returning an indication of whether the memory location was written to or read from in a previous checkpoint interval and wherein identifying the in-memory versioning mode comprises selecting a zero copy mode if the indication indicates that the memory location was written to but not read in the previous checkpoint; and wherein the operations of updating the access profile data structure with the memory access type corresponding to the memory access request comprises updating the second bloom filter.

In Example 11, the subject matter of Examples 8-10 includes, wherein the access profile data structure comprises a first bloom filter and a second bloom filter, the first bloom filter tracking memory accesses for a previous checkpoint and the second bloom filter tracking memory accesses for a current checkpoint and wherein the operations of identifying the in-memory versioning mode comprises: querying the memory location in the first bloom filter, the first bloom filter returning an indication of whether the memory location was written to or read from in a previous checkpoint interval, wherein identifying the in-memory versioning mode comprises selecting a zero copy mode if the indication indicates that the memory location was written to or read in the previous checkpoint; and wherein the operations of updating the access profile data structure with the memory access type corresponding to the memory access request comprises updating the second bloom filter.

In Example 12, the subject matter of Examples 8-11 includes, wherein the access profile data structure comprises access counters, and wherein the operations of identifying the in-memory versioning mode comprises: querying the memory location in the access profile data structure, the access profile data structure returning an indication of a number of times the memory location was written to and read from in a previous checkpoint interval and wherein identifying the in-memory versioning mode comprises selecting a zero copy mode if a read/write ratio is less than a specified value; and wherein the operations of updating the access profile data structure with the memory access type corresponding to the memory access request comprises updating the access counters based upon a type of access corresponding to the memory access request.

In Example 13, the subject matter of Examples 8-12 includes, wherein the memory access request is a write request, and wherein the operations further comprise: determining that a dirty field for a memory location corresponding to the memory access request indicates that the memory location has not yet been written to during a current checkpoint interval; responsive to determining that the dirty field indicates that the memory location has not yet been written to during the current checkpoint interval: allocating a working memory location; updating a mapping table with an address of the allocated working memory location; and writing the memory access request to the working memory location.

In Example 14, the subject matter of Examples 8-13 includes, wherein the memory access request is a write request, and wherein the operations further comprise: determining that a dirty field for a memory location corresponding to the memory access request indicates that the memory location has been written to during a current checkpoint interval; responsive to determining that the dirty field indicates that the memory location has been written to during the current checkpoint interval: determining an address of a working memory location using a mapping table; and writing the memory access request to the working memory location.

Example 15 is a non-transitory machine-readable medium storing instructions, which when executed by a memory controller of a memory system, cause the memory controller to perform operations comprising: receiving a memory access request for a memory location; responsive to receiving the memory access request, identifying an in-memory versioning mode for the memory location based upon an access profile data structure storing past access information for memory accesses and selection logic, the in-memory versioning mode either a direct copy mode or a zero copy mode, wherein the direct copy mode copying a working value from a first memory location of a pair of memory locations to a second memory location of the pair of memory locations on a first write operation after a commit or a rollback operation, the zero copy mode switching a value of a select field between the pair of memory locations upon a first write operation after a commit or rollback operation, wherein the value of the select field indicates a working location of the pair of memory locations; updating the access profile data structure based upon a memory access type corresponding to the memory access request; and processing the memory access request according to the identified versioning mode.

In Example 16, the subject matter of Example 15 includes, wherein the operations of identifying the in-memory versioning mode comprises: querying the memory location in the access profile data structure, the access profile data structure returning an indication of whether the memory location was written to in a previous checkpoint interval and wherein identifying the in-memory versioning mode comprises selecting a zero-copy mode if the indication indicates that the memory location was written to in a previous checkpoint interval.

In Example 17, the subject matter of Examples 15-16 includes, wherein the access profile data structure comprises a first bloom filter and a second bloom filter, the first bloom filter tracking memory accesses for a previous checkpoint and the second bloom filter tracking memory accesses for a current checkpoint and wherein the operations of identifying the in-memory versioning mode comprises: querying the memory location in the first bloom filter, the first bloom filter returning an indication of whether the memory location was written to or read from in a previous checkpoint interval and wherein identifying the in-memory versioning mode comprises selecting a zero copy mode if the indication indicates that the memory location was written to but not read in the previous checkpoint; and wherein the operations of updating the access profile data structure with the memory access type corresponding to the memory access request comprises updating the second bloom filter.

In Example 18, the subject matter of Examples 15-17 includes, wherein the access profile data structure comprises a first bloom filter and a second bloom filter, the first bloom filter tracking memory accesses for a previous checkpoint and the second bloom filter tracking memory accesses for a current checkpoint and wherein the operations of identifying the in-memory versioning mode comprises: querying the memory location in the first bloom filter, the first bloom filter returning an indication of whether the memory location was written to or read from in a previous checkpoint interval, wherein identifying the in-memory versioning mode comprises selecting a zero copy mode if the indication indicates that the memory location was written to or read in the previous checkpoint; and wherein the operations of updating the access profile data structure with the memory access type corresponding to the memory access request comprises updating the second bloom filter.

In Example 19, the subject matter of Examples 15-18 includes, wherein the access profile data structure comprises access counters, and wherein the operations of identifying the in-memory versioning mode comprises: querying the memory location in the access profile data structure, the access profile data structure returning an indication of a number of times the memory location was written to and read from in a previous checkpoint interval and wherein identifying the in-memory versioning mode comprises selecting a zero copy mode if a read/write ratio is less than a specified value; and wherein the operations of updating the access profile data structure with the memory access type corresponding to the memory access request comprises updating the access counters based upon a type of access corresponding to the memory access request.

In Example 20, the subject matter of Examples 15-19 includes, wherein the memory access request is a write request, and wherein the operations further comprise: determining that a dirty field for a memory location corresponding to the memory access request indicates that the memory location has not yet been written to during a current checkpoint interval; responsive to determining that the dirty field indicates that the memory location has not yet been written to during the current checkpoint interval: allocating a working memory location; updating a mapping table with an address of the allocated working memory location; and writing the memory access request to the working memory location.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method comprising:

using a processor of a memory device:

selecting, for a checkpoint interval, an in-memory versioning mode for a memory location using past access information for memory accesses of the memory location, the past access information storing access information for a previous checkpoint, the selection of the in-memory versioning mode selecting either a direct copy mode or a zero copy mode, wherein the direct copy mode copies a working value from a first memory location of a pair of memory locations to a second memory location of the pair of memory locations as a result of a commit operation, the zero copy mode switches a value of a select field between the pair of memory locations as a result of a commit or rollback operation, wherein the value of the select field indicates a working location of the pair of memory locations; and processing memory commands for the memory location according to the selected in-memory versioning mode during the checkpoint interval.

2. The method of claim 1, wherein selecting the in-memory versioning mode comprises:

querying the memory location in an access profile data structure, the access profile data structure returning an indication of whether the memory location was written to in a previous checkpoint interval and selecting a zero-copy mode if the indication indicates that the memory location was written to in the previous checkpoint interval.

3. The method of claim 1, wherein the past access information is stored in an access profile data structure comprising a first bloom filter tracking memory accesses for the previous checkpoint and a second bloom filter tracking memory accesses for a current checkpoint.

4. The method of claim 3, wherein selecting the in-memory versioning mode comprises:

querying the memory location in the first bloom filter to determine whether the memory location was written to or read from in a previous checkpoint interval and selecting the zero copy mode if the memory location was written to but not read in the previous checkpoint.

5. The method of claim 3, further comprising:

updating the second bloom filter based upon memory accesses during a current checkpoint interval.

6. The method of claim 1, wherein the past access information comprises access counters tracking a number of read accesses and write accesses to the memory location.

7. The method of claim 6, wherein selecting the in-memory versioning mode comprises:

selecting the zero copy mode if a ratio of read accesses to write accesses is less than a specified value.

8. A computing device for managing memory versioning, the computing device comprising:

a hardware processor;

a memory, the memory storing instructions, which when executed by the hardware processor cause the computing device to perform operations comprising:

selecting, for a checkpoint interval, an in-memory versioning mode for a memory location using past access information for memory accesses of the memory location, the past access information storing access information for a previous checkpoint, the selection of the in-memory versioning mode selecting either a direct copy mode or a zero copy mode, wherein the direct copy mode copies a working value from a first memory location of a pair of memory locations to a second memory location of the pair of memory locations as a result of a commit operation, the zero copy mode switches a value of a select field between the pair of memory locations as a result of a commit or rollback operation, wherein the value of the select field indicates a working location of the pair of memory locations; and processing memory commands for the memory location according to the selected in-memory versioning mode during the checkpoint interval.

9. The computing device of claim 8, wherein the operation of selecting the in-memory versioning mode further comprises:

querying the memory location in an access profile data structure, the access profile data structure returning an indication of whether the memory location was written to in a previous checkpoint interval and selecting a zero-copy mode if the indication indicates that the memory location was written to in the previous checkpoint interval.

10. The computing device of claim 8, wherein the past access information is stored in an access profile data structure comprising a first bloom filter tracking memory accesses for the previous checkpoint and a second bloom filter tracking memory accesses for a current checkpoint.

11. The computing device of claim 10, wherein the operation of selecting the in-memory versioning mode further comprises:

querying the memory location in the first bloom filter to determine whether the memory location was written to or read from in a previous checkpoint interval and selecting the zero copy mode if the memory location was written to but not read in the previous checkpoint.

12. The computing device of claim 10, wherein the operations further comprise:

updating the second bloom filter based upon memory accesses during a current checkpoint interval.

13. The computing device of claim 8, wherein the past access information comprises access counters tracking a number of read accesses and write accesses to the memory location.

14. The computing device of claim 13, wherein the operation of selecting the in-memory versioning mode further comprises:

selecting the zero copy mode if a ratio of read accesses to write accesses is less than a specified value.

15. A non-transitory machine-readable medium, storing instructions for managing memory versioning, the instructions, which when executed, cause the machine to perform operations comprising:

selecting, for a checkpoint interval, an in-memory versioning mode for a memory location using past access information for memory accesses of the memory location, the past access information storing access information for a previous checkpoint, the selection of the in-memory versioning mode selecting either a direct copy mode or a zero copy mode, wherein the direct copy mode copies a working value from a first memory location of a pair of memory locations to a second memory location of the pair of memory locations as a result of a commit operation, the zero copy mode switches a value of a select field between the pair of memory locations as a result of a commit or rollback operation, wherein the value of the select field indicates a working location of the pair of memory locations; and processing memory commands for the memory location according to the selected in-memory versioning mode during the checkpoint interval.

16. The non-transitory machine-readable medium of claim 15, wherein the operation of selecting the in-memory versioning mode further comprises:

querying the memory location in an access profile data structure, the access profile data structure returning an indication of whether the memory location was written to in a previous checkpoint interval and selecting a zero-copy mode if the indication indicates that the memory location was written to in the previous checkpoint interval.

17. The non-transitory machine-readable medium of claim 15, wherein the past access information is stored in an access profile data structure comprising a first bloom filter tracking memory accesses for the previous checkpoint and a second bloom filter tracking memory accesses for a current checkpoint.

18. The non-transitory machine-readable medium of claim 17, wherein the operation of selecting the in-memory versioning mode further comprises:

querying the memory location in the first bloom filter to determine whether the memory location was written to or read from in a previous checkpoint interval and selecting the zero copy mode if the memory location was written to but not read in the previous checkpoint.

19. The non-transitory machine-readable medium of claim 17, wherein the operations further comprise:

updating the second bloom filter based upon memory accesses during a current checkpoint interval.

20. The non-transitory machine-readable medium of claim 15, wherein the past access information comprises access counters tracking a number of read accesses and write accesses to the memory location.

* * * * *